United States Patent Office 3,048,520
Patented Aug. 7, 1962

3,048,520
ANTISPASMODIC
Herbert McKennis, Jr., and Edward R. Bowman, Richmond, Va., assignors to Medical College of Virginia Foundation, Richmond, Va., a corporation of Virginia
No Drawing. Filed June 6, 1960, Ser. No. 33,929
9 Claims. (Cl. 167—65)

This invention relates to a novel medical preparation which possesses therapeutic properties. More particularly it relates to novel medicinal preparations useful in lowering blood pressure, as muscular relaxants, as antispasmodics and in a more general sense as tranquillizers, and which do not produce untoward side effects commonly associated with the use of presently known medicines taken for the same benefits, namely: dryness of the mouth, salivation, constipation, blurring of vision, headaches, difficulty in excretion and the like.

Cotinine is the name given to 5-(3′ pyridyl)-1-methyl pyrrolidinone-2. The cotinine which exhibits the desired therapeutic properties, free from undesirable side effects is (—)-cotinine, and in the description which follows, all references to cotinine are intended to designate the (—) compound unless specifically otherwise indicated. The cotinine is preferably of relatively high purity, although in some instances it is feasible to utilize cotinine containing small amounts of nicotine. If the cotinine has been prepared by treating nicotine with oxidizing agents such as hydrogen peroxide or air, this offers obvious advantages in economy.

One method of preparing the (—)-cotinine or its derivatives, from nicotine, preferred by us, is that described by Pinner (Ber d. Chem. Ges 26, 2807, 1893). Alternatively the cotinine may be prepared by treating nicotine with oxidizing agents such as $H_2O_2$ or air. Still another known method of preparing (—)-cotinine is that of Sugasawa, Tatsuno and Kamiya described in volume 49 of Chemical Abstracts, page 12460 (1955).

The usefulness of (—)-cotinine as a therapeutic agent is not limited to the base itself but extends also to derivatives made by reacting cotinine with suitable acids. For example, such derivatives may be produced by reacting equimolar quantities of cotinine and inorganic acids such as hydrochloric and sulfuric or organic acids such as acetic, propionic or fumaric. Furthermore by reacting one mole of cotinine with one-half mole of a dibasic acid such as sulfuric, maleic or succinic or with one-third mole of a tribasic acid such as phosphoric it becomes possible to prepare solutions of cotinine with varying pH values. Virtually any acid may be used provided that the acid selected has low or limited toxicity.

While we do not wish to be bound to any specific explanation of the manner in which the reaction products of cotinine with acids behave in the body, it is believed that the resulting compounds dissociate in the body with the formation of a positive ion which is capable of penetrating cells.

Recently published information has disclosed that (—)-nicotine administered to the rat and the dog is excreted with the urine of these animals as any of several compounds obtained by metabolism of nicotine. Cotinine (5-(3′-pyridyl) 1-methyl pyrrolidone-2) has been identified as one of these products (J,A,C.S. 79, 6342 (1957); 80, 1634 (1958), and 80, 6597 (1958)). The demethylation of cotinine in vivo is described in J.A.C.S. 81, (1959), and the structure of a keto amide formed in the metabolism of (—)-cotinine is further described in the J.A.C.S. 82, page 3974 (1960), now in press.

In the experiments described, no noticeable therapeutic effects were observed, possibly because the dosages of nicotine were insufficient to produce a sufficient quantity of cotinine as a metabolite or possibly because the action of cotinine produced in situ along with other metabolites is different from the effect of cotinine administered alone.

It has now been found that when administered intravenously, or orally e.g. in water or as an acid or base, in doses of from about 150–300 mg. (—)-cotinine is almost immediately effective in lowering blood pressure and as a muscular relaxant for between 5 and 8 hours. The muscular effect induces a state which may be described as tranquillizing. The muscular relaxing or antispasmodic effects of cotinine are further illustrated in the following examples:

*Example 1*

A dog, weighing 14 kg., was placed under pentobarbital anesthesia and the intestinal motility was continuously recorded by means of a balloon in the jejunum. Following intravenous inject of (—)-cotinine (150 mg./kg.) there was a marked decrease in intestinal motility which became apparent within four seconds after administration of the compound.

*Example 2*

Under similar conditions for recording a dose of 75 mg./kg. produced a similar effect. By use of a large dose (300 mg./kg.) a decrease in intestinal motility was produced with longer duration of action. A dose of 500 mg./kg. produced a decrease in intestinal motility which lasted for six hours.

*Example 3*

A bath of Tyrode's solution was prepared by dissolving the following in sufficient water to make 1000 cc. of solution:

|  | G. |
|---|---|
| NaCl | 8 |
| $CaCl_2$ | 0.2 |
| KCl | 0.2 |
| $NaHCO_3$ | 1 |
| Glucose | 1 |
| $MgCl_2$ | 0.1 |
| $NaH_2PO_4$ | 0.05 |

Oxygen was bubbled steadily through the bath and an excised piece of rabbit jejunum was suspended in the oxygenated Tyrode's solution. Histamine at a concentration equivalent to 1 g. in 500 liters of solution was provided to increase tonus of the jejunum. The addition of sufficient (—)-cotinine to produce a concentration of about 0.5% by weight in the Tyrode's solution restored the tonus to the pre-histamine level and markedly decreased the amplitude of contractions in the piece of rabbit intestine.

*Example 4*

The experiment of Example 3 was repeated using pitressin at concentrations of from 1 g. to 600 g. in 500 liters to increase tonus and amplitude. Addition of sufficient cotinine to the oxygenated Tyrode's solution to produce a concentration of about 0.05% by weight restored the tonus to the pre-pitressin level and decreased the amplitude of contractions.

The blocking effect of (—)-cotinine on nicotine was demonstrated by similar experiments in vitro. After administration of nicotine to animal subjects, (—)-cotinine was administered in the amounts indicated, and with the results reported below.

*Example 5*

Another piece of rabbit jejunum was suspended in the oxygenated Tyrode's solution. After addition of sufficient nicotine to produce a concentration of 1:200,000 in the solution, the rabbit jejunum showed an enhanced tonus. The addition of sufficient cotinine to establish a concentration of 1:2000 by weight resulted in restoration of tonus to the tissue. The fall in tonus was gradual and led subsequently to a tonus below the pre-nicotine level.

*Example 6*

An effect similar to that of Example 5 was produced by establishing a cotinine concentration of 1:200. In this case the fall of tonus was markedly more precipitous.

*Example 7*

A mongrel dog was anesthetized with sodium pentobarbital. The blood pressure at the right carotid artery was 120 mm. Hg (systolic) and 110 mm. Hg (diastolic). Cotinine was administered to the left femoral vein. The blood pressure was reduced to 80 mm. Hg (diastolic) and 90 mm. Hg (systolic). The blood pressure returned to the pre-injection level in approximately thirty seconds.

*Example 8*

In an experiment similar to that in Example 7, the injection of cotinine (250 mg./kg. of body weight) lowered the blood pressure from 120 mm. Hg (systolic) and 110 mm. Hg (diastolic) to 65 (systolic) and 55 (diastolic). Bood pressure remained at a reduced level for approximately two minutes.

*Example 9*

Example 8 was repeated except that the dose was increased to 500 mg. per kg. of body weight. As a result the lowered blood pressure was sustained for up to 2 hours after the injection of cotinine.

*Example 10*

The pressor response to nicotine, i.e. the increase in blood pressure following the administration of nicotine, was blocked by pre-treatment with cotinine. This was demonstrated by the intravenous administration of 500 mg./kg. to a male mongrel dog under pentobarbital anesthesia, followed by the administration of a physiological dose of nicotine (0.125 mg./kg.). There was noted the usual depressor response to the nicotine but followed by a pressor response sufficient to bring the blood pressure back to the pre-cotinine level.

*Example 11*

The spasmolytic effect of cotinine to induced spasms in an intact guinea pig uterus was demonstrated as follows:

A normally contracting uterus was suspended in Tyrode's solution. Spasms were induced by the addition of 0.2 I.U. of pitocin to the bath. There was an immediate increase in tonus. Following the addition of cotinine to produce a concentration 0.05% by weight in the bath, the tonus was decreased to the pre-pitocin level.

Similar physiological effects have been observed when cotinine (4 mg./kg.) has been administered orally to humans with a spastic colon.

We claim:
1. The method of tranquillizing a living host which comprises the step of internally contacting cotinine with the living host.
2. The method of tranquillizing a living host comprising administering cotinine in dosage amounts.
3. The method of claim 2 wherein the dosage amounts are greater than 150 mg.
4. The method of claim 2, wherein the administration is oral.
5. The method of claim 2, wherein the administration is intravenous.
6. The method of claim 2, wherein the subject is human and the dosage is about 4 mg. per kg. of body weight.
7. The method of reducing the physiological effects of nicotine on a living host comprising administering cotinine to the living host.
8. The method of tranquillizing a living host comprising administering to a host a salt of cotinine.
9. The method of tranquillizing a living host comprising treating the host with a derivative of cotinine formed from the reaction of cotinine and a compound selected from the group consisting of organic and inorganic acids.

References Cited in the file of this patent
Sugasawa et al.: Chem. Abs. 49, p. 12,460 (1955).